United States Patent [19]
Pifferi

[11] 3,843,687
[45] Oct. 22, 1974

[54] METHOD FOR THE PREPARATION OF DERIVATIVES OF 5-HYDROXY-2-CARBOXYCHROMONE

[75] Inventor: Giorgio Pifferi, Milan, Italy

[73] Assignee: I.S.F., S.p.A., Milan, Italy

[22] Filed: June 6, 1972

[21] Appl. No.: 260,273

[30] Foreign Application Priority Data
July 2, 1971 Italy .................................. 26560/71

[52] U.S. Cl. ............................ 260/345.2, 424/283
[51] Int. Cl. ............................................. C02d 7/34
[58] Field of Search ................................ 260/345.2

[56] References Cited
UNITED STATES PATENTS
3,419,578  12/1968  Fitzmaurice et al. ............ 260/345.2

*Primary Examiner*—John M. Ford
*Attorney, Agent, or Firm*—Shlesinger, Fitzsimmons & Shlesinger

[57] ABSTRACT

A method for the preparation of derivatives of the 5-hydroxy-2-carboxychromone is disclosed, said derivatives having the general formula

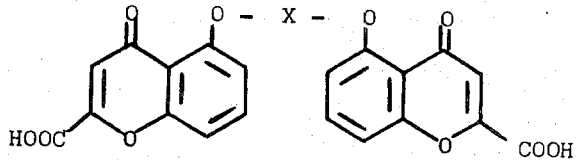

wherein X is an aliphatic alkyl having from $C_3$ to $C_7$ with its chain possibly interrupted by an oxygen atom and preferably containing a secondary alcoholic grouping, by alkaline hydrolysis of the corresponding lower alkyl ester, the latter being prepared starting from the corresponding bis-phenoxy derivative (a) by double Claisen reaction with an alkyl oxalate in the presence of an alkali metal alcoholate as the catalyst, and (b) by cyclizing the intermediate thus obtained in an acidic environment, the improvement consisting in that the reaction with the alkyl oxalate is carried out in an alcoholic protic solvent in the presence of stoichiometric amounts of the alkali metal alcoholate at a temperature not above 50°C and for a time not longer than 3 hours, the cyclization being carried out by adding an anhydrous mineral acid to the reaction mass. By so doing, the preparation of the expected compounds is cheaper, quicker and gives virtually quantitative yields.

3 Claims, No Drawings

METHOD FOR THE PREPARATION OF DERIVATIVES OF 5-HYDROXY-2-CARBOXYCHROMONE

This invention relates to a novel method for preparing duplication derivatives of 5-hydroxy-2-carboxychromone having the general formula:

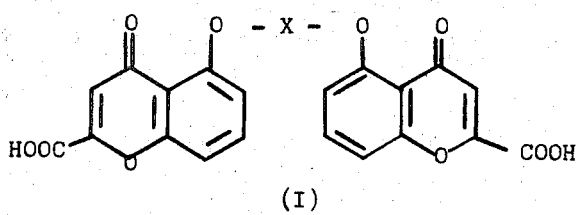

(I)

wherein X is either a linear or branched aliphatic radical having from $C_3$ to $C_7$, preferably containing a secondary alcoholic grouping and possibly interrupted by an oxygen atom.

It is known that the compounds (I) and their salts with appropriate organic and inorganic cations which are physiologically acceptable possess particular pharmacological properties, inasmuch as they act as inhibitors of the complex antigen-antibody reactions in the therapy of asthmatic syndromes and antiimmunologic syndromes in general (cf. J. Pepys et al., "Proceedings on Disodium Chromoglycate in Allergic Airways Disease" London, Butterworths, 1969).

According to the literature, the alkali metal salts of the compounds having the formula (I) are prepared by alkaline hydrolysis and subsequent repeated purifications of the corresponding esters having the formula:

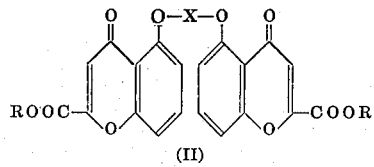

(II)

wherein R is a lower alkyl radical and X has the meaning as defined hereinabove. The compounds (II) in turn, since they are symmetrical derivatives of hydroxychromones, are preferably prepared starting from the corresponding bis-phenoxy derivatives having the formula (III):

by a double Claisen reaction with an alkyl oxalate in the presence of alkaline catalysts, such as sodium ethoxide. Upon isolation and purification of the intermediates (IV), they are cyclized in an acidic environment to give the corresponding chromones (II).

The conventionally known methods for the preparation of the compounds (II) starting from (III) and alkyl oxalates (cf., for example, C. Fitzmaurice et al., Brit. Pat. Nos. 1,144,905 and 1,144,906 of 12th March, 1969) prescribe well defined conditions for being put into practice, among which the most important are:

a. The use of an aprotic solvent, admixed or not with limited amounts of ethanol (for example: benzene-ethanol)
b. Refluxing the suspension
c. Long reaction times, up to 20–24 hours
d. An excess of alcoholate, preferably sodium ethoxide
e. Isolation and purification of the intermediate (IV) and subsequent cyclization to chromone (II).

These conditions correspond to those which are well known as suggested by the technical literature for optimizing the Claisen reaction. As a matter of fact, the notoriously accepted mechanism for such a reaction:

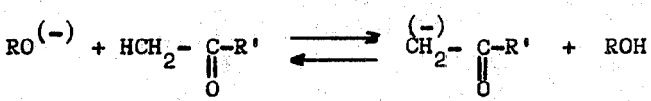

teaches that an excess of alcoholate $RO^{(-)}$ and stripping the alcohol should shift the equilibrium towards the right, thus encouraging the formation of the reactive anion

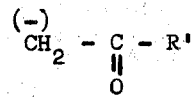

(cf., for example, J. D. Roberts et al., "Basic Principles of Organic Chemistry" Benjamin Inc., New York, 1965, page 538).

An essential aspect of the present invention is to improve to a substantial degree the preparation of the esters having the formula (II), so as to allow extremely bland operative conditions while avoiding the concurrent decomposition and resinification process which are conducive to unsatisfactory yields and to less pure end products as well. According to another facet of the present invention, it is provided that the conversion of the derivatives having the formula (III) into the cyclic esters having the formula (II) may occur at a single-

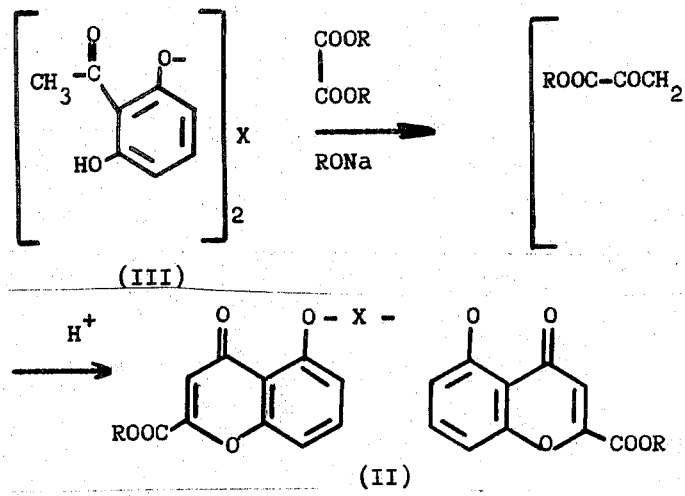

step process without any necessity for isolating the intermediates having the formula (IV), the industrial preparation thus becoming obviously simpler, quicker and cheaper.

In fact, it has been surprisingly ascertained that, by carrying out the above indicated reaction (III to II) in an alcoholic protic solvent, the progress of the reaction is extremely quick and is quantitative, even at room temperature.

As a matter of fact, a method has been found, for the synthesis of derivatives of 5-hydroxy-2-carboxychromone, having the general formula:

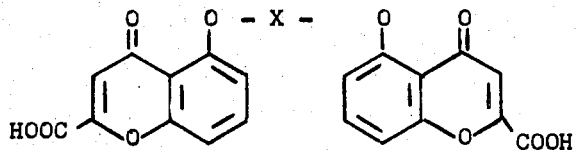

Wherein X is an aliphatic radical having from $C_3$ to $C_7$, possibly having its chain interrupted by an oxygen atom and containing, preferably, a secondary alcoholic grouping, by alkaline hydrolysis of the corresponding ester having the general formula:

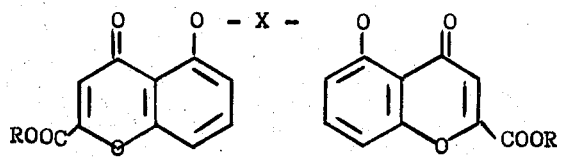

wherein R is a lower alkyl radical and X has the meaning as defined hereinabove, said ester being prepared starting from the corresponding bis-phenoxy derivative by double Claisen reaction with an alkyl oxalate in the presence of an alkaline catalyst and cyclization of the intermediate product thus obtained in an acidic environment, characterized in that the reaction with the alkyl oxalate is carried out in an alcoholic protic solvent in the presence of stoichiometric amounts of an alkali metal alcoholate, at a temperature not higher than 50°C and for a time of not more than 3 hours, the cyclization being performed by merely adding an anhydrous mineral acid to the reaction mass.

In substance, the novel method according to the present invention is characterized:

a. by the use of a protic solvent, such as methanol, ethanol, propanol, etc., in an absolute absence of aprotic solvents.

b. in that the reaction takes place, preferably, at room temperature, but the temperature can be raised to 40°–50°C.

c. in that the reaction times are at least twenty times a submultiple of those required by the conventional methods.

d. in that the alkali metal alcoholate is used in stoichiometric amounts.

e. in that the cyclization of the intermediate (IV) to the chromone (II) is carried out without isolation, by direct acidification of the reaction mass with an anhydrous inorganic acid.

By comparing the novel operative conditions with those described in the literature, the advancement achieved in the technology with the novel industrial method becomes fully conspicuous.

In addition to the virtually quantitative yields (the yields indicated by the literature never exceed 66 percent of theory), and to the significant reduction of the reaction times and temperatures (with the attendant reduction of running costs), also the quality of the end product is considerably improved.

It is known, in fact, that the Claisen reaction is reversible (back-Claisen) and that the oxalyl derivatives of the kind (IV) readily lose carbon monoxide by heating, according to the general behaviour of the alpha-keto esters which are heat-sensitive (cf. J. D. Roberts et al., "Basic Principles of Organic Chemistry", Benjamin Inc., New York, 1965, page 541). Conversely, by carrying out the Claisen reaction under the conditions of the present invention, such emission of carbon monoxide is no longer experienced. More particularly, the 1,3-bis-(2-carboethoxychromone-5-iloxy)-2-hydroxypropane (II, R = $C_2H_5$;

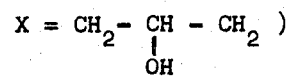

has the aspect of a straw-yellow crystal having a melting point of 186°–188°C and an absolute chromatographic purity. Conversely, the product which is obtained, in a much lesser amount, by working according to the suggestions of the British Pat. Specn. No. 1,144,905 is of a darker shade, is difficult to purify and melts at 180°–182°C. Consequently, with the method of the present invention, also the bi-sodium salt obtained from the corresponding ester by saponification with NaOH, is directly obtained in a pure state without any necessity of further purification steps.

The considerations developed above make it apparent that the modifications introduced in the synthesis run of the products having the formula (II) substantially improve the times, temperatures, yields, costs and quality of the chromones (II) and their salts (I) and permit that the isolation of the intermediates (IV) may be dispensed with. Such modifications were absolutely unpredictable on the basis of what had been disclosed in the technical literature and more particularly in the above indicated patents.

It is particularly to be emphasized that, to the ends of the Claisen reaction, it was deemed preferably that aprotic solvents had to be used (as clearly suggested by the literature), whereas for the cyclization of the product (IV) it is preferable to operate in an alcoholic solution. This is the reason why all the conventional methods for the preparation of the derivatives having the formulas (I) and (II) provide for two discrete steps, with the separation and purification of the intermediate (IV).

The invention is illustrated in more detail in the following examples which are given by way of illustration only and without limitation. More particularly, the examples 1a, 1b, 1c and 1d are referred to the case in which X is 2-hydroxypropyl, whereas in the examples 2a and 2b, X is propyl.

EXAMPLE 1 a. 1,3-bis-(2-carbethoxychromone-5-iloxy)-2-hydroxypropane.

A solution of sodium ethoxide, prepared with 159 grams sodium and 3 liters of abs.ethanol, is supplemented, with stirring with 500 grams of 1,3-bis-(2-acetyl-3-hydroxyphenoxy)-2-hydroxypropane. The stirred mixture is then supplemented, dropwise and at a temperature of 10°C, by 950 ml. ethyl oxalate and, on completion of the addition, the yellow solution thus obtained is heated to 40°–45°C during 40 minutes. The mixture is cooled to 5°C and made acidic by addition of a 10 percent solution of HCl in ethanol. The mixture is heated again with gentle stirring at 50°C for 30 mins. and is then cooled at 5°C with iced water. The bulky precipitate is collected under suction washed with ethanol and with water and then crystallized from 20 liters of tetrahydrofuran in the presence of 10 grams activated charcoal. By concentrating the filtrate to one tenth of its original volume one obtains 626 grams (yield 86 percent of theory) of the product (that is, 1,3-bis-(2-carbethoxychromone-5-iloxy)-2-hydroxypropane) of a light straw-yellow color and a m.p. of 186°–188°C, which is unitary to chromatographic analysis on a thin layer. (Silica-gel HF; eluent: dioxan-ethyl acetate-tetrahydrofuran 60/20/20, visualization with UV light 250 millimicrons and with 0.1N $I_2$).

b. 1,3-bis-(2-carboxychromone-5-iloxy)-2-hydroxypropane (bi-sodium salt).

A suspension of 626 grams of 1,3-bis-(2-carboethoxychromone-5-iloxy)-2-hydroxypropane, finely powdered, in 5 liters of 95 percent ethanol is treated with 2.05 equivalents of 2N NaOH and heated with stirring at 70°C during 30 minutes. The fine crystal which separates is collected in hot conditions by suction and is washed by slurrying with lukewarm ethanol until neutrality of the product is reached. Upon drying an oven, there are obtained 635 grams (91 percent of theory) of the bisodium salt of 1,3-bis-(2-carboxychromone-5-iloxy)-2-hydroxypropane tetrahydrate as virtually colorless crystals with a m.p. of 267°–270°C (decomp.). The substance is unitary to thin layer chromatography (Silica-gel HF; eluent 95% EtOH - 25% NH$_4$OH - H$_2$O - 100/16/12; visualization with UV light millimicrons and with 0.1N $I_2$).

c. 1,3-bis-(2-carboxychromone-5-iloxy)-2-hydroxypropane.

An aqueous solution of the bisodium salt of 1,3-bis-(2-carboxychromone-5-iloxy)-2-hydroxypropane is made acidic to Congo red with diluted hydrochloric acid. The precipitate is collected under suction and dried and 1,3-bis-(2-carboxychromone-5-iloxy)-2-hydroxypropane monohydrate is obtained with virtually theoretic yields as a practically colorless crystal having a m.p. of 243°–245°C (dec.).

d. Dipiperidine salt of 1,3-bis-(2-carboxychromone-5-iloxy)-2-hydroxypropane.

An aqueous solution of 1,3-bis-(2-carboxychromone-5-iloxy)-2-hydroxypropane is treated with two equivalents of piperidine. The solution which is obtained is concentrated in a vacuo and cooled to give with virtually quantitative yields the dipiperidine salt of 1,3-bis-(2-carboxychromone-5-iloxy)-2-hydroxypropane.

EXAMPLE 2 a. 1,3-bis-(2-carboethoxychromone-5-iloxy)-propane.

By adopting the same procedure as in Example 1a, 138 grams of 1,3-bis-(2-acetyl-3-hydroxyphenoxy)-propane are condensed with diethyl oxalate and sodium ethoxide at room temperature during 2 hours. There are obtained 185 grams (89 percent of theory) of 1,3-bis-(2-carboethoxychromone-5-iloxy)-propane having a m.p. of 186°–188°C (decomp.).

b. Bisodium salt of 1,3-bis-(2-carboxychromone-5-iloxy)-propane.

By adopting the same procedure of example 1b, 185 grams of 1,3-bis-(2-carboethoxychromone-5-iloxy)-propane have been treated with 2.04 equivalents of 2N NaOH to give 180 grams (96 percent of theory) of the bisodium salt of 1,3-bis-(2-carboethoxylchromone-5-iloxy)-propane monohydrate in the form of virtually colorless crystals.

What is claimed is:

1. In a method for the preparation of a 5-hydroxy-2-carboxychromone of the formula:

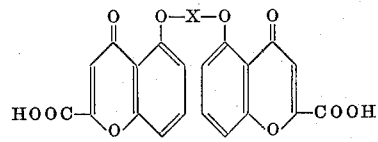

wherein X is alkylene or hydrogen-substituted alkylene group have from three to seven carbon atoms and carrying an alcoholic (—CH—OH) group inserted in the alkylene chain, by alkaline hydrolysis of the corresponding lower alkyl esters, said esters being prepared starting from the corresponding bis-phenoxy derivative, the improvement which comprises reacting the corresponding bis-phenoxy derivative of the formula:

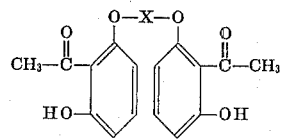

with a lower dialkyl oxalate in an alcoholic protic solvent in the presence of stoichiometric amounts of a lower alkali metal alcoholate at a temperature not above 50°C for a period of time not longer than 3 hours, the cyclization being carried out by merely adding an anhydrous mineral acid to the reaction mass.

2. A method according to claim 1 wherein said alcoholic protic solvent is ethanol.

3. A method according to claim 1 wherein the reaction with the dialkyl oxalate is carried out at room temperature.

* * * * *